United States Patent
Moon et al.

(10) Patent No.: US 10,742,130 B2
(45) Date of Patent: Aug. 11, 2020

(54) PHASE SHIFT BRIDGE CONVERTER USING CLAMP CIRCUIT CONNECTED TO THE CENTER-TAP OF THE TRANSFORMER ON THE SECONDARY SIDE

(71) Applicant: Korea Advanced Institute of Science and Technology, Daejeon (KR)

(72) Inventors: Gun Woo Moon, Daejeon (KR); Cheon-Yong Lim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/285,161

(22) Filed: Feb. 25, 2019

(65) Prior Publication Data
US 2020/0076318 A1    Mar. 5, 2020

(30) Foreign Application Priority Data
Aug. 28, 2018    (KR) .................. 10-2018-0101232

(51) Int. Cl.
*H02M 3/335*    (2006.01)
*H02M 7/487*    (2007.01)

(52) U.S. Cl.
CPC ....... *H02M 3/33592* (2013.01); *H02M 7/487* (2013.01)

(58) Field of Classification Search
CPC .................... H02M 3/33592; H02M 7/487
See application file for complete search history.

(56) References Cited

U.S. PATENT DOCUMENTS 5,923,547 A * 7/1999 Mao ................. H02M 1/34
    363/132
7,859,870 B1 * 12/2010 Schutten ........... H02M 3/337
    363/132
(Continued)

FOREIGN PATENT DOCUMENTS

CN    102412715 A    4/2012

OTHER PUBLICATIONS

Baek et al., "Novel Zero-Voltage and Zero-Current Switching (ZVZCS) Full Bridge PWM Converter with a Low Output Current Ripple," *The Transactions of the Korean Institute of Electrical Engineers*, vol. 47, No. 10, pp. 1651-1658 (1998).
(Continued)

*Primary Examiner* — Adolf D Berhane
*Assistant Examiner* — Kevin H Sprenger
(74) *Attorney, Agent, or Firm* — Foley & Lardner LLP

(57)    ABSTRACT

Disclosed are a new phase shift full bridge (PSFB) converter using a clamp circuit connected to a center-tapped clamp circuit and an operating method thereof. The new PSFB converter using a clamp circuit connected to a center-tapped clamp circuit includes a primary-side circuit including a plurality of inductors connected to one end between a first switch and a second switch which are connected in series and to one end between a third switch and a fourth switch which are connected in series and a secondary-side circuit using a voltage applied by the primary-side circuit and including a clamping circuit configured with a first rectifier diode, a second rectifier diode, a third rectifier diode, a fourth rectifier diode, a first clamping diode, a second clamping diode and a capacitor in a center-tapped clamp circuit.

11 Claims, 8 Drawing Sheets

(56) References Cited

U.S. PATENT DOCUMENTS

| | | | |
|---|---|---|---|
| 2006/0170043 A1* | 8/2006 | Liu | H02M 1/08 257/341 |
| 2007/0159866 A1* | 7/2007 | Siri | H02M 3/33592 363/95 |
| 2014/0016386 A1* | 1/2014 | Weis | H02M 7/217 363/126 |

OTHER PUBLICATIONS

Office Action issued in Korean Patent Application No. 10-2018-0101232, dated Sep. 6, 2019.

* cited by examiner (a)

(b)

(c)

(a)

(b)

(a)

(b)

(a)

(b)

(a)

(b)

PHASE SHIFT BRIDGE CONVERTER USING CLAMP CIRCUIT CONNECTED TO THE CENTER-TAP OF THE TRANSFORMER ON THE SECONDARY SIDE

CROSS REFERENCE TO RELATED APPLICATION

This application is based on and claims priority under 35 U.S.C. 119 to Korean Patent Application No. 10-2018-0101232, filed on Aug. 28, 2018, in the Korean Intellectual Property Office, the disclosures of which is herein incorporated by reference in their entireties.

BACKGROUND OF THE INVENTION

1. Technical Field

The present invention relates to a new phase shift full bridge (PSFB) converter using a clamp circuit connected to the center tap of transformer on the secondary side and an operating method thereof.

2. Description of the Related Art

A pulse with modulation (PWM) phase shift full bridge (PSFB) is widely applied in the power range of several kW for a battery charger. The PWM PSFB has advantages in that primary switches can achieve a zero-voltage switching turn-on operation and can be simply controlled compared to a frequency-modulation converter. However, when the PWM PSFB is applied to a battery charger for electric vehicles, the following disadvantages may be present. First, a conduction loss increases due to a high circulation current because the range of an output voltage is very wide. Voltage stress in a rectification stage seriously increases and a switching loss occurring in the rectification stage is very large because an output voltage is large and a large reverse recovery current flows on the secondary side. Next, there is a problem in that the size of the output filter stage is increased because the output voltage is large.

Lots of researches have been carried out to improve the disadvantages of the PSFB. First, a full bridge converter in which the frequency shifts was proposed in order to obviate a circulation current and to reduce the size of an output inductor. However, there is a problem in that the optimal design of a magnetic substance or an electric condenser becomes difficult because an operating frequency is very widely changed with respect to an output voltage range. Many active clamp schemes have been introduced to reduce the voltage stress of a rectification stage on the secondary side. However, there are problems in that power density is lowered and the reliability of the circuit is degraded because switches are additionally used. Research for reducing the switching loss of the rectification stage on the secondary side has been carried out, but there is a problem in that an additional conduction loss and a switching loss occur because the switch is positioned in the path along which power is transferred.

SUMMARY OF THE INVENTION

An embodiment of the present invention provides a converter capable of improving problems, such as a high circulation current, severe voltage stress and a switching loss on the secondary side, and a large output filter, that is, disadvantages of the existing PWM full bridge converters. The proposed converter can obviate a circulation current, can lower voltage stress on the secondary side, and can reduce a switching loss of a rectification stage through a structure in which a clamping circuit having an electric condenser and an rectifier is connected to a center-tapped clamp circuit on the secondary side of a transformer.

In one aspect, a phase shift full bridge (PSFB) converter includes a primary-side circuit including a plurality of inductors connected to one end between a first switch and a second switch which are connected in series and to one end between a third switch and a fourth switch which are connected in series, and a secondary-side circuit using a voltage applied by the primary-side circuit and including a clamping circuit configured with a first rectifier diode, a second rectifier diode, a third rectifier diode, a fourth rectifier diode, a first clamping diode, a second clamping diode and a capacitor in a center-tapped clamp circuit.

The secondary-side circuit removes a circulation current, lowers voltage stress of the secondary-side circuit, and reduces a switching loss of the secondary-side circuit and the size of an output filter through the structure in which the clamping circuit is connected.

Voltages of second rectifier diode and the fourth rectifier diode are clamped two times to a clamp voltage when the first clamping diode becomes conductive right after commutation of a current, flowing through the second clamping diode, to the first rectifier diode and the third rectifier diode.

In the secondary-side circuit, a current flowing through the first rectifier diode and the third rectifier diode starts commutation to the second clamping diode, and a circulating current is removed when a negative voltage is applied to the parasitic inductance of the primary-side circuit by a clamp voltage applied to the secondary-side circuit.

In the secondary-side circuit, an output inductor starts to be reset right after the commutation of the current from the first rectifier diode and the third rectifier diode to the second clamping diode is started, a voltage applied to the output inductor is reduced as much as a clamp voltage to decrease a burden of the output inductor, the first rectifier diode and the third rectifier diode are turned off by all output currents flow through only the second clamping diode, and an inverse voltage equivalent to the clamp voltage is applied to reduce a switching loss of the rectifier diode.

In the secondary-side circuit, a switch of a lagging leg and the parasitic capacitors of the rectifier diodes of the secondary-side circuit participate in resonance, and zero-voltage switching is performed by current energy stored in magnetization inductance.

The secondary-side circuit performs zero-voltage switching by only current energy of parasitic inductance when a voltage of the secondary-side circuit is clamped to a clamp voltage and magnetization inductance does not participate in resonance.

In another aspect, an operating method of a phase shift full bridge converter includes the following steps—The phase shift full bridge (PSFB) converter includes a primary-side circuit and a secondary-side circuit, the secondary-side circuit uses a voltage applied by the primary-side circuit and includes a clamping circuit configured with a first rectifier diode, a second rectifier diode, a third rectifier diode, a fourth rectifier diode, a first clamping diode, a second clamping diode and a capacitor in a center-tapped clamp circuit-: Conducting the first clamping diode right after commutation of a current, flowing through the second clamping diode, to the first rectifier diode and the third rectifier diode, starting, by a current flowing through the first rectifier diode and the third rectifier diode, commutation to the second clamping diode, resetting an output inductor right after the commutation of the current from the first rectifier diode and the third rectifier diode to the second clamping diode, participating in, by a switch of a lagging leg and parasitic capacitors of the rectifier diodes of the secondary-side circuit, in resonance and performing zero-voltage switching by current energy stored in magnetization inductance, and performing zero-voltage switching by only current energy of the parasitic inductance when a voltage of the secondary-side circuit is clamped to a clamp voltage and the magnetization inductance does not participate in the resonance.

In the step of conducting the first clamping diode right after commutation of a current, flowing through the second clamping diode, to the first rectifier diode and the third rectifier diode, the second rectifier diode and the fourth rectifier diode are clamped two time the clamp voltage.

In the step of starting, by a current flowing through the first rectifier diode and the third rectifier diode, commutation to the second clamping diode, a circulating current is removed by a negative voltage applied to the parasitic inductance of the primary-side circuit by the clamp voltage applied to the secondary-side circuit.

The step of resetting an output inductor right after the commutation of the current from the first rectifier diode and the third rectifier diode to the second clamping diode comprises the steps of reducing a voltage applied to the output inductor as much as the clamp voltage to decrease a burden of the output inductor, and turning off the first rectifier diode and the third rectifier diode by all output currents flowing through only the second clamping diode and applying an inverse voltage equivalent to the clamp voltage to reduce a switching loss of the rectifier diode.

DETAILED DESCRIPTION

Embodiments of the present invention propose a new full bridge converter capable of improving the disadvantages of the existing phase shift full bridge (PSFB). The embodiments of the present invention are described in detail below with reference to the accompanying drawings.

Figure 1:
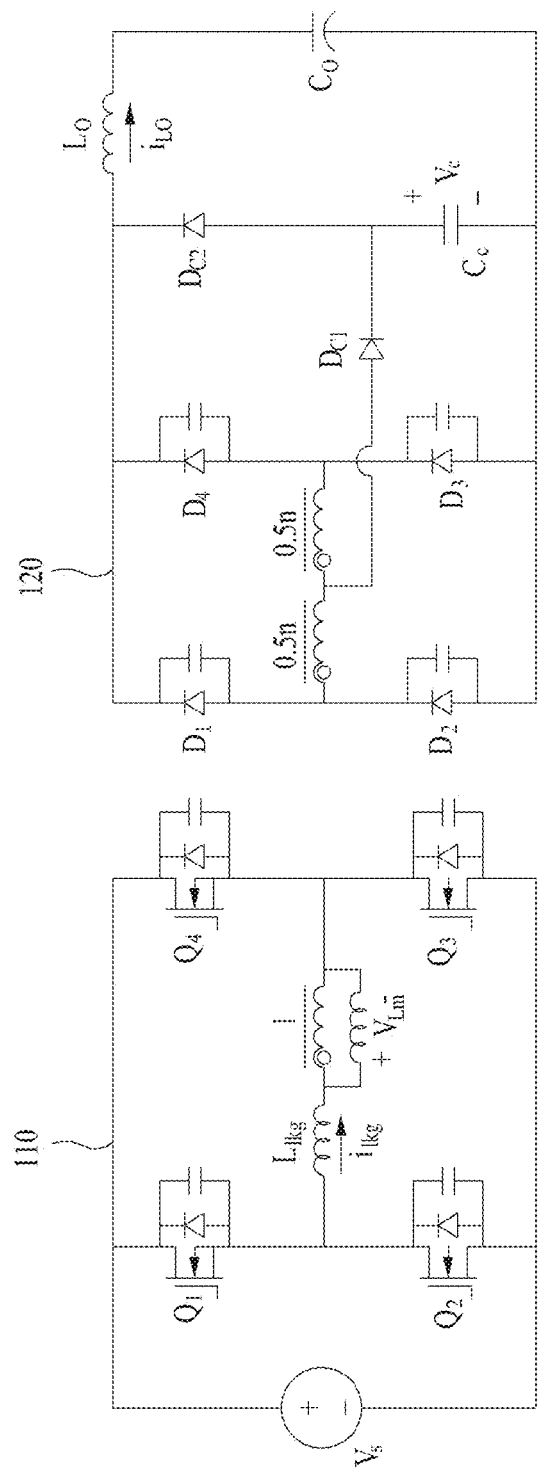
FIG. 1 is a circuit diagram of a new PSFB converter using a clamp circuit connected to a center-tapped clamp circuit according to an embodiment of the present invention.

FIG. 1 is a circuit diagram of a new PSFB converter using a clamp circuit connected to a center-tapped clamp circuit according to an embodiment of the present invention.

The proposed new PSFB converter using a clamp circuit connected to a center-tapped clamp circuit has a structure in which a clamping circuit having an electric condenser and a rectifier is connected to the center-tapped clamp circuit of the secondary-side circuit of a transformer. The PSFB converter according to an embodiment of the present invention includes a primary-side circuit 110 configured to include a plurality of inductors connected to one end between a first switch $Q_1$ and second switch $Q_2$ that are connected in series and to one end between a third switch $Q_3$ and a fourth switch $Q_4$ that are connected in series, and a secondary-side circuit 120 configured to use a voltage applied by the primary-side circuit 110 and to include a clamping circuit configured with a first rectifier diode $D_1$, a second rectifier diode $D_2$, a third rectifier diode $D_3$, a fourth rectifier diode $D_4$, a first clamping diode $D_{C1}$, a second clamping diode $D_{C2}$ and a capacitor $C_C$ in a center-tapped clamp circuit.

The secondary-side circuit 120 removes a circulation current, lowers the voltage stress of the secondary-side circuit 120, and reduces a switching loss of the secondary-side circuit 120 and the size of an output filter through the structure in which the clamping circuit is connected.

Furthermore, voltages of the second rectifier diode D2 and the fourth rectifier diode D4 are clamped two times to a clamp voltage $V_C$ because the first clamping diode $D_{C1}$ becomes conductive right after the commutation of a current, flowing through the second clamping diode $D_{C2}$, to the first rectifier diode D1 and the third rectifier diode D3.

In the secondary-side circuit 120, a current flowing through the first rectifier diode $D_1$ and the third rectifier diode $D_3$ starts commutation to the second clamping diode $D_{C2}$, and a circulating current is removed because a negative voltage is applied to the parasitic inductance of the primary-side circuit 110 by the clamp voltage $V_C$ applied to the secondary-side circuit 120.

In the secondary-side circuit 120, an output inductor starts to be reset right after the commutation of the current from the first rectifier diode $D_1$ and the third rectifier diode $D_3$ to the second clamping diode $D_{C2}$, and a voltage applied to the output inductor is reduced by the clamp voltage $V_C$ to decrease a burden of the output inductor. Furthermore, the first rectifier diode $D_1$ and the third rectifier diode $D_3$ are turned off because all the output currents flow through only the second clamping diode $D_{C2}$, and an inverse voltage equivalent to the clamp voltage is applied to reduce a switching loss of the rectifier diode.

In the secondary-side circuit 120, a switch of a lagging leg and the parasitic capacitors of the rectifier diodes $D_1$, $D_2$, $D_3$ and $D_4$ of the secondary-side circuit participate in resonance, and zero-voltage switching is performed by current energy stored in magnetization inductance.

The secondary-side circuit 120 performs the zero-voltage switching by only current energy of the parasitic inductance when a voltage of the secondary-side circuit is clamped to the clamp voltage and the magnetization inductance does not participate in the resonance. The structure of the new PSFB converter using a clamp circuit connected to a center-tapped clamp circuit according to an embodiment of the present invention is described more specifically with reference to FIGS. 2, 3 and 4.

Figure 2:
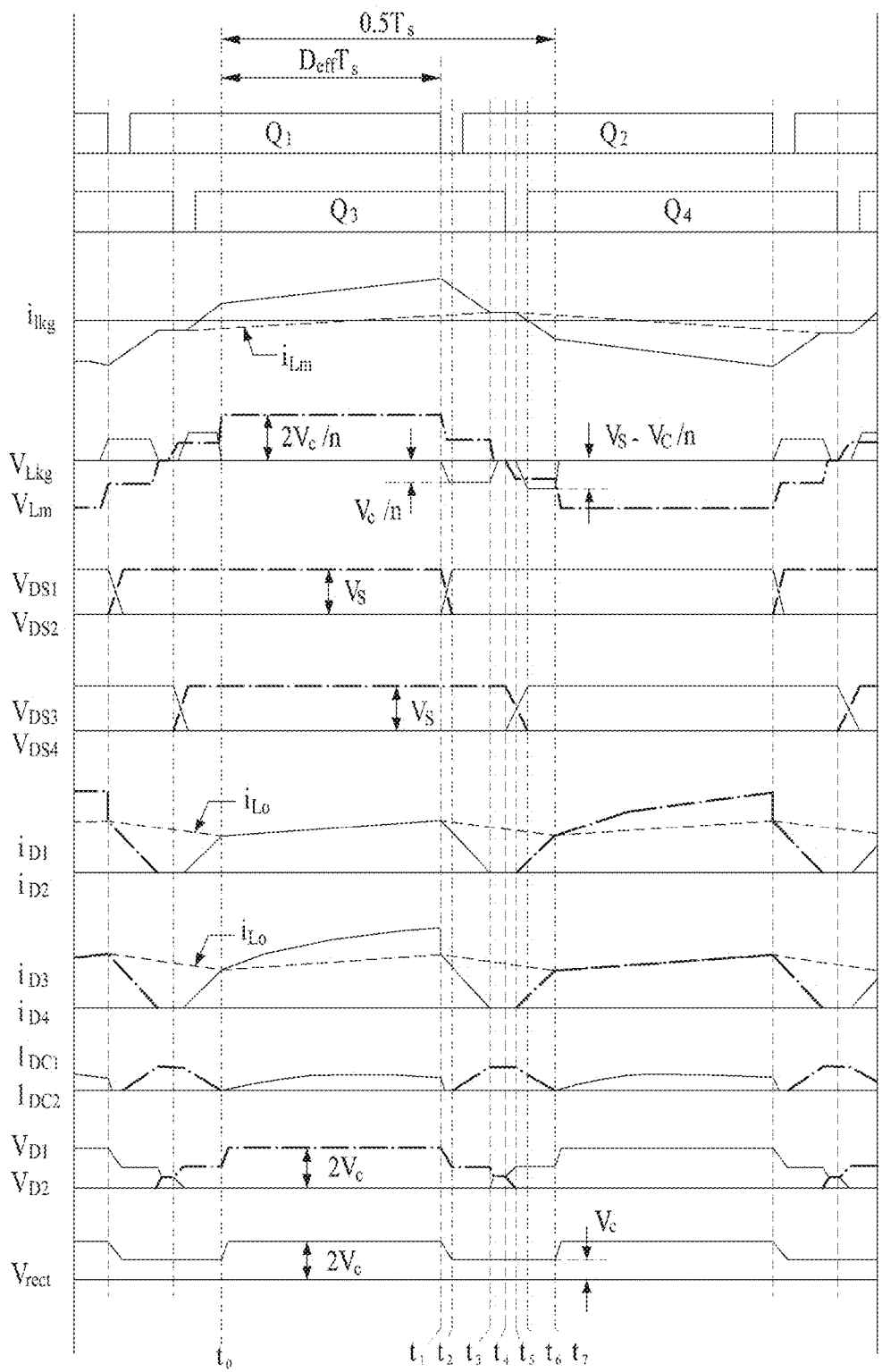
FIG. 2 shows operating waveforms of the PSFB converter according to an embodiment of the present invention.

FIG. 2 shows operating waveforms of the PSFB converter according to an embodiment of the present invention.

An output voltage is controlled by adjusting the phase as in the phase shift full bridge (PSFB). More specifically, FIG.

2 shows waveforms of currents and voltages flowing into the plurality of inductors connected to one end between the first switch $Q_1$ and second switch $Q_2$ of the primary-side circuit and one end between the third switch $Q_3$ and the fourth switch $Q_4$ that are connected in series, and the first rectifier diode $D_1$, second rectifier diode $D_2$, third rectifier diode $D_3$, fourth rectifier diode $D_4$, first clamping diode $D_{C1}$, second clamping diode $D_{C2}$ and capacitor $C_C$ of the secondary-side circuit.

Figure 3:
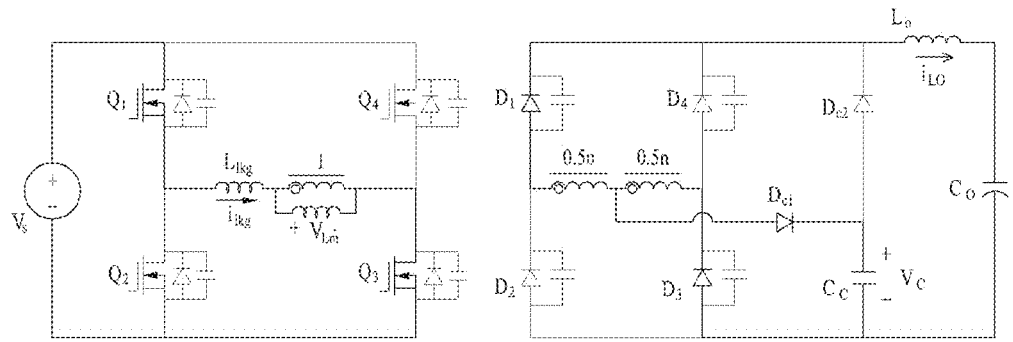
FIG. 3 shows equivalent circuit diagrams according to major sections according to an embodiment of the present invention.
Figure 3:
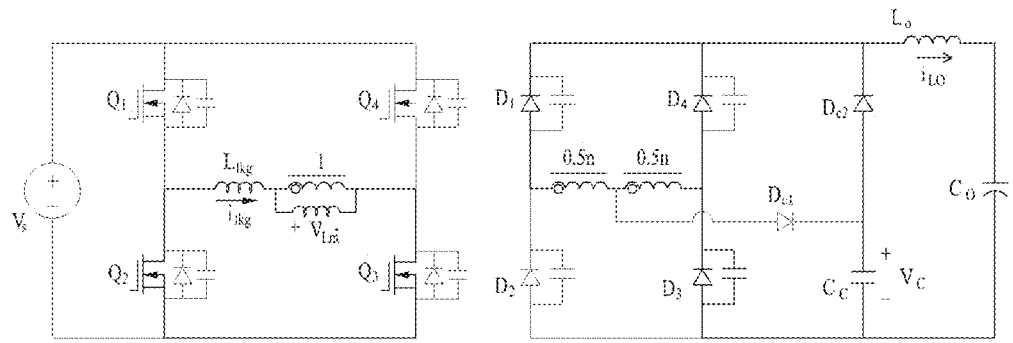
Figure 3:
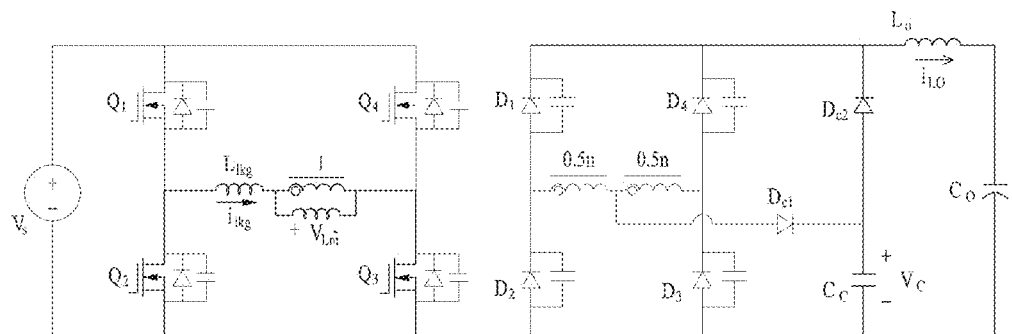

FIG. 3 shows equivalent circuit diagrams according to major sections according to an embodiment of the present invention.

FIG. 3(a) is a section $t_0$-$t_1$ which starts right after the commutation of a current, flowing through $D_{C2}$, to the rectifier diodes $D_1$ and $D_3$. In this case, since $D_{C1}$ becomes conductive, voltages of the rectifier diodes $D_2$ and $D_4$ on the opposite side are clamped two times to the clamp voltage $V_C$. FIG. 3(b) is a section $t_2$-$t_3$ in which $Q_2$ and $Q_4$ are turned on after the zero-voltage switching of the lagging leg is turned on. The current flowing through $D_1$ and $D_3$ starts commutation to $D_{C2}$. Since the $V_C$ voltage has been applied to the secondary side of the transformer, a circulating current is removed by a negative voltage applied to the parasitic inductance of the primary-side circuit.

FIG. 3(c) is a section $t_3$-$t_4$ which starts right after the commutation of the current from $D_1$ and $D_3$ to $D_{C2}$. The section is the section in which the output inductor starts to be reset. A burden of the output inductor is reduced because $V_O$-$V_C$ is applied to the output inductor unlike in the existing PSFB in which the output voltage $V_O$ is applied to the output inductor without any change. Furthermore, $D_1$ and $D_3$ are turned off because all the output currents flow through $D_{C2}$. A switching loss occurring in the rectifier diode can be reduced because a low inverse voltage $V_C$ is applied.

Figure 4:
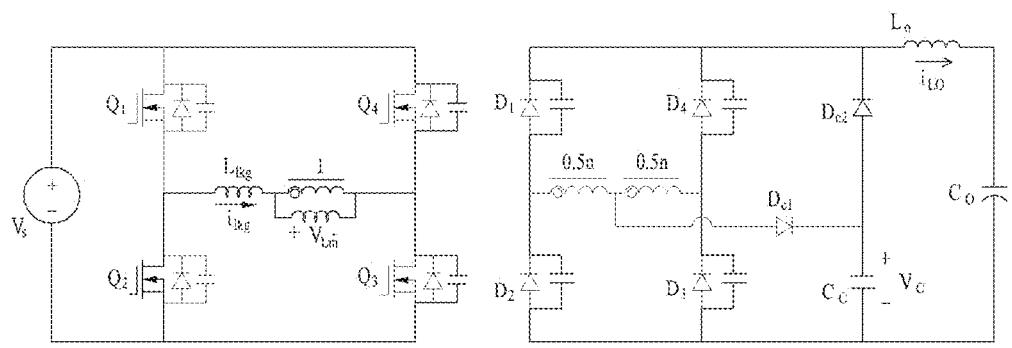
FIG. 4 is an equivalent circuit diagram upon zero-voltage switching according to an embodiment of the present invention.
Figure 4:
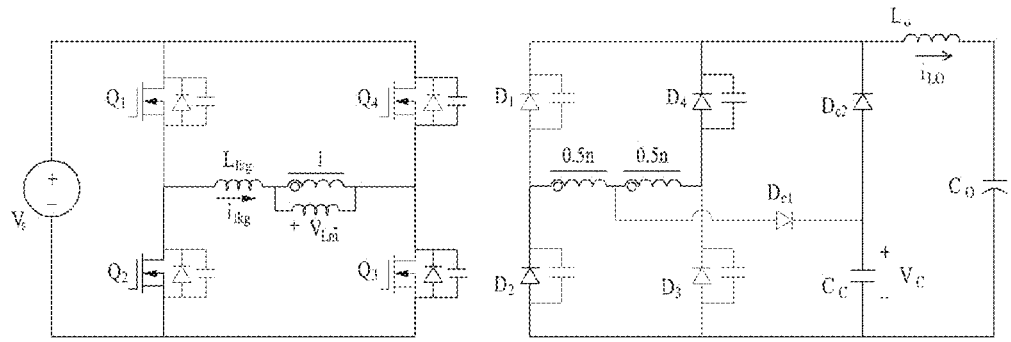

FIG. 4 is an equivalent circuit diagram upon zero-voltage switching according to an embodiment of the present invention.

FIG. 4 shows an equivalent circuit when the switch on the lagging leg side performs zero-voltage switching, which is a more unfavorable condition. Zero-voltage switching is performed in two sections. FIG. 4(a) is a section $t_4$-$t_5$ which starts when $Q_3$ is turned off. The switch of the lagging leg and the parasitic capacitors of the rectification stage of the secondary-side circuit participate in resonance. In this section, zero-voltage switching is performed by current energy stored in magnetization inductance. FIG. 4(b) is a section $t_5$-$t_6$ which starts when a voltage of the transformer of the secondary-side circuit is clamped to $V_C$. Zero-voltage switching is performed by only current energy of the parasitic inductance because magnetization inductance does not participate in resonance from this point of time.

Figure 5:
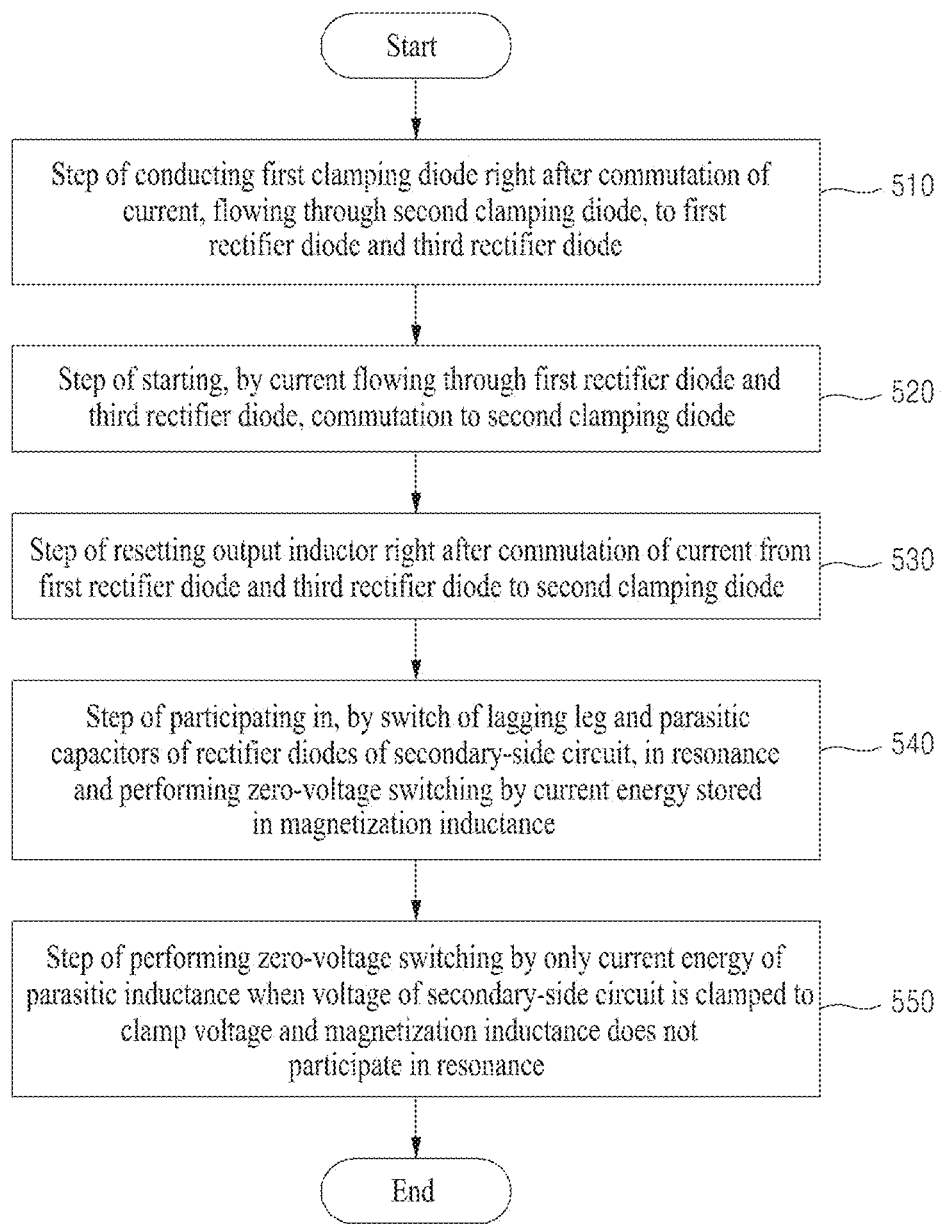
FIG. 5 is a flowchart for illustrating an operating method of the new PSFB converter using a clamp circuit connected to a center-tapped clamp circuit according to an embodiment of the present invention.

FIG. 5 is a flowchart for illustrating an operating method of the new PSFB converter using a clamp circuit connected to a center-tapped clamp circuit according to an embodiment of the present invention.

The operating method of the PSFB converter including the primary-side circuit and the secondary-side circuit using a voltage applied by the primary-side circuit and including, in the center-tapped clamp circuit, the clamping circuit configured with the first rectifier diode, the second rectifier diode, the third rectifier diode, the fourth rectifier diode, the first clamping diode, the second clamping diode and the capacitor includes step 510 of conducting the first clamping diode right after the commutation of a current, flowing through the second clamping diode, to the first rectifier diode and the third rectifier diode, step 520 of starting, by a current flowing through the first rectifier diode and the third rectifier diode, commutation to the second clamping diode, step 530 of resetting the output inductor right after the commutation of the current from the first rectifier diode and the third rectifier diode to the second clamping diode, step 540 of participating in, by the switch of the lagging leg and the parasitic capacitors of the rectifier diodes of the secondary-side circuit, in resonance and performing zero-voltage switching by current energy stored in magnetization inductance, and step 550 of performing zero-voltage switching by only current energy of the parasitic inductance when a voltage of the secondary-side circuit is clamped to a clamp voltage and magnetization inductance does not participate in the resonance.

Step 510 corresponds to the section $t_0$-$t_1$ which starts right after the commutation of a current, flowing through $D_{C2}$, to the rectifier diodes $D_1$ and $D_3$. In this case, since $D_{C1}$ becomes conductive, voltages of the rectifier diodes $D_2$ and $D_4$ on the opposite side are clamped two times to the clamp voltage $V_C$.

Step 520 corresponds to the section $t_2$-$t_3$ in which $Q_2$ and $Q_4$ are turned on after the zero-voltage switching of the lagging leg is turned on. The current flowing through $D_1$ and $D_3$ starts commutation to $D_{C2}$. Since the $V_C$ voltage has been applied to the secondary side of the transformer, a circulating current is removed by a negative voltage applied to the parasitic inductance of the primary-side circuit.

Step 530 corresponds to the section $t_3$-$t_4$ which starts right after the commutation of the current from $D_1$ and $D_3$ to $D_{C2}$. The section is the section in which the output inductor starts to be reset. A burden of the output inductor is reduced because $V_O$-$V_C$ is applied to the output inductor unlike in the existing PSFB in which the output voltage $V_O$ is applied to the output inductor without any change. Furthermore, $D_1$ and $D_3$ are turned off because all the output currents flow through $D_{C2}$. A switching loss occurring in the rectifier diode can be reduced because a low inverse voltage $V_C$ is applied.

Step 540 corresponds to the section $t_4$-$t_5$ which starts when $Q_3$ is turned off. The switch of the lagging leg and the parasitic capacitors of the rectification stage of the secondary-side circuit participate in resonance. In this section, zero-voltage switching is performed by current energy stored in magnetization inductance.

Step 550 corresponds to the section $t^5$-$t_6$ which starts when a voltage of the transformer of the secondary-side circuit is clamped to $V_C$. Zero-voltage switching is performed by only current energy of the parasitic inductance because magnetization inductance does not participate in resonance from this point of time.

Figure 6:
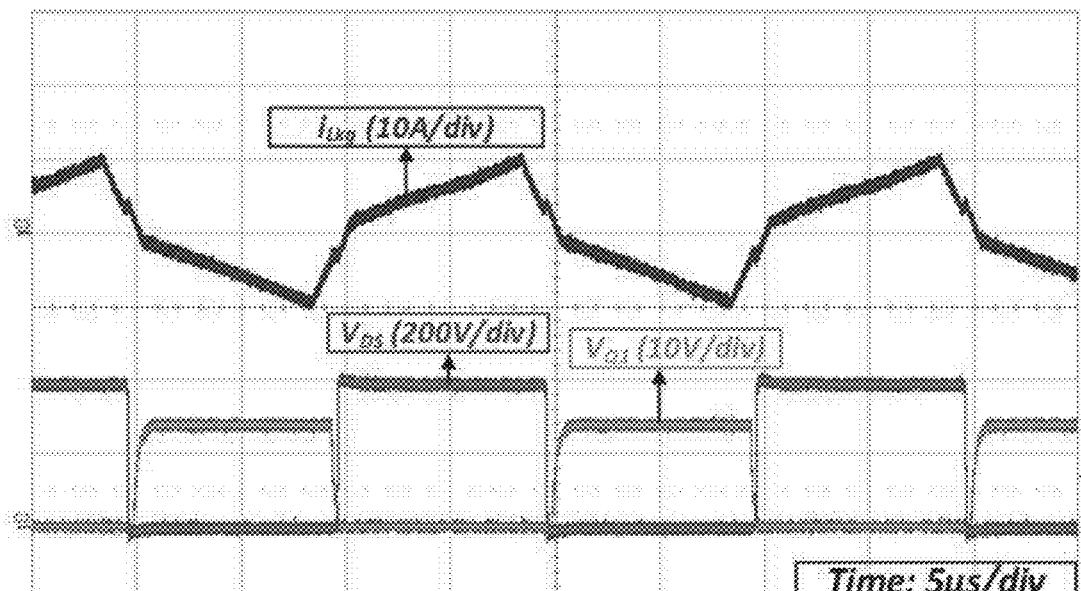
FIG. 6 shows major waveforms of the proposed circuit in a 50% load when fixed output voltage CV charging is performed according to an embodiment of the present invention.
Figure 6:
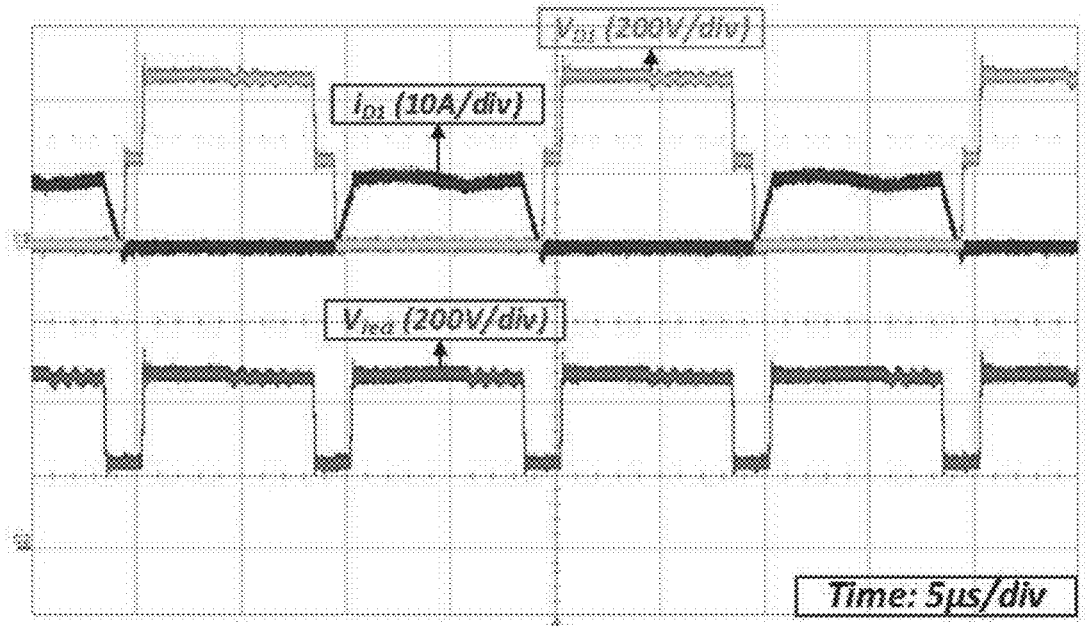

FIG. 6 shows major waveforms of the proposed circuit in a 50% load when fixed output voltage CV charging is performed according to an embodiment of the present invention.

In order to verify performance of the proposed converter, a prototype converter having 385V input and 270-420V/7.85 A output was fabricated and tested.

From FIG. 6(a), it can be seen that the circulating current of the primary-side circuit was removed. From FIG. 6(b), it can be seen that voltage stress of the rectifier diode was clamped to $2V_C$ and a switching loss was reduced because a low inverse voltage equivalent to $V_C$ was applied right after the diode was turned off. Furthermore, from a voltage waveform applied to the output inductor through the rectification stage of the secondary-side circuit, it can be seen that a burden of the output filter was reduced because the voltage $V_C$ was applied when the output inductor was reset.

Figure 7:
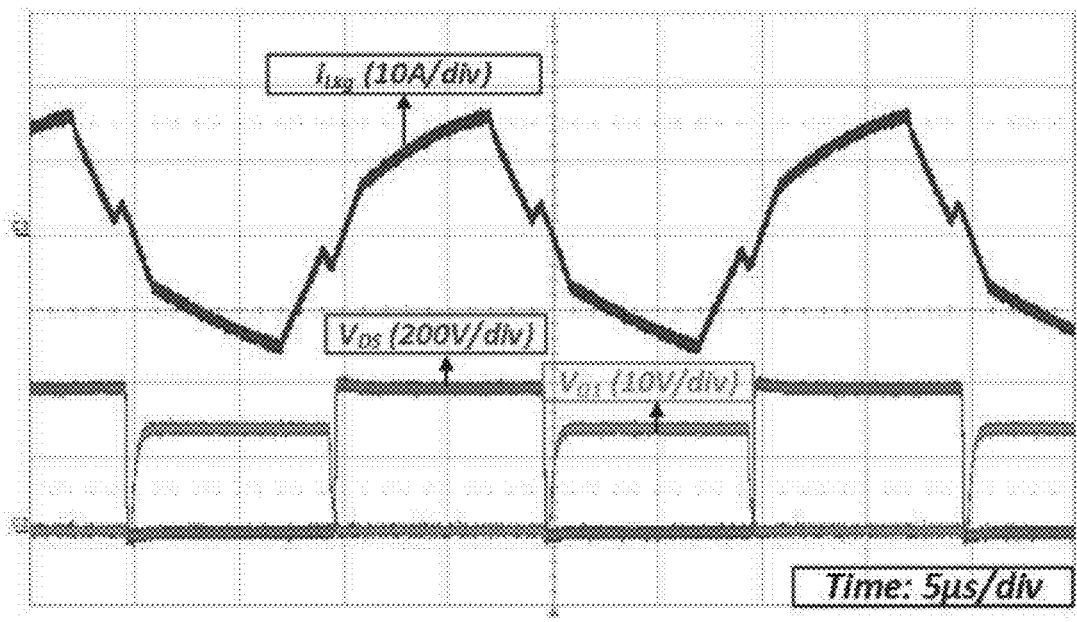
FIG. 7 is a diagram showing major waveforms in an output voltage of 360V when fixed output current CC charging is performed according to an embodiment of the present invention.
Figure 7:
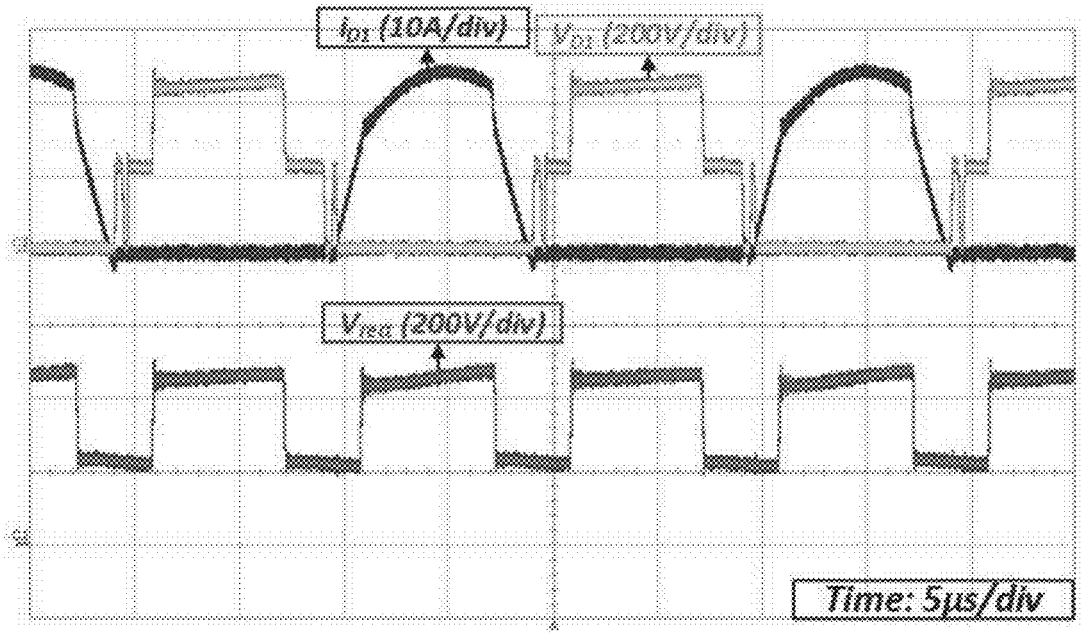

FIG. 7 is a diagram showing major waveforms in an output voltage of 360V when fixed output current CC charging is performed according to an embodiment of the present invention.

Advantages of the proposed converter can be seen from FIG. 7. The converter according to an embodiment of the present invention can improve problems, such as a high circulation current, severe voltage stress and a switching loss on the secondary side, and a great output filter, that is, disadvantages of the existing PWM full bridge converters. The proposed converter can remove a circulation current, can lower voltage stress on the secondary side, can reduce a switching loss of a rectification stage, and can also reduce the size of the output filter through the structure in which the clamping circuit having the electric condenser and the rectifier is connected to the center-tapped clamp circuit on the secondary side of the transformer.

Figure 8:
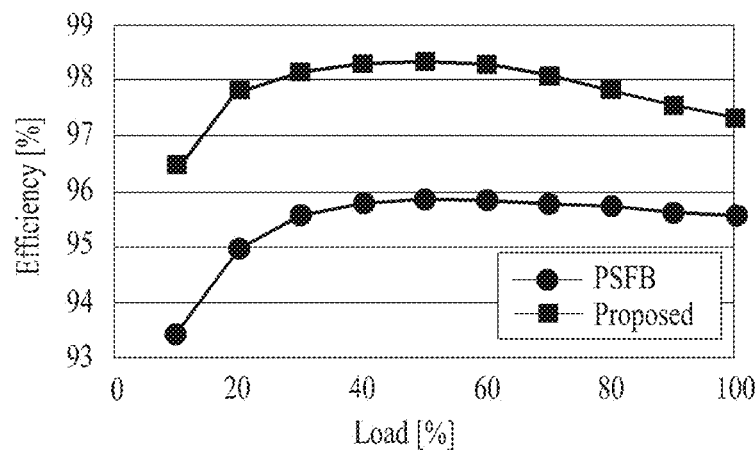
FIG. 8 is an efficiency graph according to an embodiment of the present invention.
Figure 8:
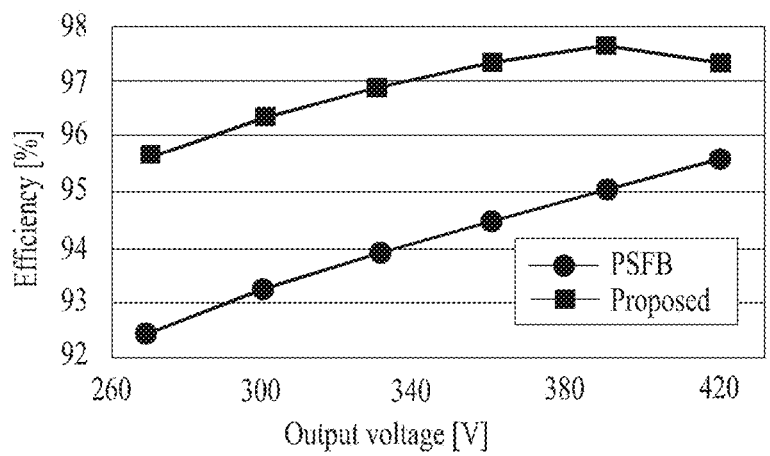

FIG. 8 is an efficiency graph according to an embodiment of the present invention.

FIG. 8 is a graph in which efficiency of the proposed converter and efficiency of the existing PWM full bridge converter are compared when CV charging and CC charging are performed. From FIG. 8, it can be seen that high efficiency was achieved in the entire load area and the entire output voltage area.

The converter according to an embodiment of the present invention can improve problems, such as a high circulation current, severe voltage stress and a switching loss on the secondary side, and a great output filter, that is, disadvantages of the existing PWM full bridge converters. The proposed converter can remove a circulation current, can lower voltage stress on the secondary side, can reduce a switching loss of a rectification stage, and can also reduce the size of the output filter through the structure in which the clamping circuit having the electric condenser and the rectifier is connected to the center-tapped clamp circuit on the secondary side of the transformer.

As described above, although the embodiments have been described in connection with the limited embodiments and the drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

What is claimed is:

1. A phase shift full bridge (PSFB) converter, comprising:
a primary-side circuit comprising a plurality of inductors connected to one end between a first switch and a second switch which are connected in series and to one end between a third switch and a fourth switch which are connected in series; and
a secondary-side circuit using a voltage applied by the primary-side circuit and comprising a first rectifier diode, a second rectifier diode, a third rectifier diode, a fourth rectifier diode, and a clamping circuit connected to a center tap of the secondary-side circuit, the clamping circuit including a first clamping diode, a second clamping diode and a capacitor, wherein the first clamping diode is oriented in a forward direction from the center tap to a connection point connecting the second clamping diode and the capacitor,
wherein in the secondary-side circuit, a switch of a lagging leg and parasitic capacitors of the first, second, third and fourth rectifier diodes of the secondary-side circuit participate in resonance, and zero-voltage switching is performed by current energy stored in magnetization inductance,
wherein the secondary-side circuit performs zero-voltage switching by only current energy of parasitic inductance when a voltage of the secondary-side circuit is clamped to a clamp voltage and magnetization inductance does not participate in resonance, and
wherein in the secondary-side circuit,
an output inductor starts to be reset right after commutation of a current from the first rectifier diode and the third rectifier diode to the second clamping diode,
a voltage applied to the output inductor is reduced as much as a clamp voltage to decrease a burden of the output inductor,
the first rectifier diode and the third rectifier diode are turned off by all output currents flow through only the second clamping diode, and
an inverse voltage equivalent to the clamp voltage is applied to reduce a switching loss of a rectifier diode.

2. The PFSB converter of claim 1, wherein the secondary-side circuit removes a circulation current, lowers voltage stress of the secondary-side circuit, and reduces a switching loss of the secondary-side circuit and a size of an output filter through the structure in which the clamping circuit is connected.

3. The PFSB converter of claim 1, wherein voltages of the second rectifier diode and the fourth rectifier diode are clamped two times to a clamp voltage when the first clamping diode becomes conductive right after commutation of a current, flowing through the second clamping diode, to the first rectifier diode and the third rectifier diode.

4. The PFSB converter of claim 1, wherein in the secondary-side circuit, a current flowing through the first rectifier diode and the third rectifier diode starts commutation to the second clamping diode, and a circulating current is removed when a negative voltage is applied to parasitic inductance of the primary-side circuit by a clamp voltage applied to the secondary-side circuit.

5. The PFSB converter of claim 1, wherein the first clamping diode is directly connected to the center tap, the second clamping diode, and the capacitor.

6. The PFSB converter of claim 5, wherein the second clamping diode is oriented in a forward direction from a connection point connecting the first clamping diode and the capacitor to a connection point connecting the first rectifier diode and the fourth rectifier diode.

7. An operating method of a phase shift full bridge (PSFB) converter comprising a primary-side circuit and a secondary-side circuit using a voltage applied by the primary-side circuit and comprising a first rectifier diode, a second rectifier diode, a third rectifier diode, a fourth rectifier diode, and a clamping circuit connected to a center tap of the secondary-side circuit, the clamping circuit including a first clamping diode, a second clamping diode and a capacitor, the method comprising:
conducting the first clamping diode in a forward direction from the center tap to a connection point connecting the second clamping diode and the capacitor, right after commutation of a current, flowing through the second clamping diode, to the first rectifier diode and the third rectifier diode;

starting, by a current flowing through the first rectifier diode and the third rectifier diode, commutation to the second clamping diode;

resetting an output inductor right after commutation of a current from the first rectifier diode and the third rectifier diode to the second clamping diode;

participating in, by a switch of a lagging leg and parasitic capacitors of the first, second, third and fourth rectifier diodes of the secondary-side circuit, in resonance and performing zero-voltage switching by current energy stored in magnetization inductance; and performing zero-voltage switching by only current energy of the parasitic inductance when a voltage of the secondary-side circuit is clamped to a clamp voltage and the magnetization inductance does not participate in the resonance, wherein the step of resetting an output inductor right after commutation of a current from the first rectifier diode and the third rectifier diode to the second clamping diode comprises steps of:

reducing a voltage applied to the output inductor as much as the clamp voltage to decrease a burden of the output inductor, and turning off the first rectifier diode and the third rectifier diode by all output currents flowing through only the second clamping diode and applying an inverse voltage equivalent to the clamp voltage to reduce a switching loss of a rectifier diode.

8. The method of claim 7, wherein in the step of conducting the first clamping diode right after commutation of a current, flowing through the second clamping diode, to the first rectifier diode and the third rectifier diode, voltages of the second rectifier diode and the fourth rectifier diode are clamped two times to the clamp voltage.

9. The method of claim 7, wherein in the step of starting, by a current flowing through the first rectifier diode and the third rectifier diode, commutation to the second clamping diode, a circulating current is removed by a negative voltage applied to the parasitic inductance of the primary-side circuit by the clamp voltage applied to the secondary-side circuit.

10. The method of claim 7, wherein the first clamping diode is directly connected to the center tap, the second clamping diode, and the capacitor.

11. The method of claim 10, wherein the second clamping diode is oriented in a forward direction from a connection point connecting the first clamping diode and the capacitor to a connection point connecting the first rectifier diode and the fourth rectifier diode.

* * * * *